US008234100B2

(12) United States Patent  (10) Patent No.: US 8,234,100 B2
Duijvestijn et al.  (45) Date of Patent: Jul. 31, 2012

(54) GENERAL FRAMEWORK TO PREDICT PARAMETRIC COSTS

(75) Inventors: Lidwina M. Duijvestijn, DZ Woerden (NL); Pedro A. Ferreira de Silva, Amsterdam Zuid-Oost (NL); Peter H. Rongen, DX Amersfoort (NL)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/346,017

(22) Filed: Dec. 30, 2008

(65) Prior Publication Data
US 2010/0169066 A1    Jul. 1, 2010

(51) Int. Cl.
*G06F 17/50* (2006.01)
*G06G 7/62* (2006.01)

(52) U.S. Cl. ........................ 703/13; 709/224
(58) Field of Classification Search ...................... 703/13
See application file for complete search history.

(56) References Cited

U.S. PATENT DOCUMENTS

| 6,209,033 | B1 * | 3/2001 | Datta et al. ..................... 709/224 |
| 7,058,560 | B1 | 6/2006 | Arakawa et al. |
| 2002/0022952 | A1 * | 2/2002 | Zager et al. ..................... 703/22 |
| 2007/0277151 | A1 * | 11/2007 | Brunel et al. .................. 717/113 |

OTHER PUBLICATIONS

Bondavalli et al, "Dependability Analysis in the Early Phases of UML-Based System Design", Comput. Syst. Sci. & Eng. 5: pp. 265-275, 2001.*
Liu et al, "Analysis of Integration Models for Service Composition", WOSP'02, Proceedings of the 3rd International Workshop on Software and Performance, 2002.*
Janneck et al, "Modeling Hierarchical and Recursive Structures Using Parametric Petri Nets", Society for Computer Simulation, 1998.*
Lopez-Grao et al, "From UML Activity Diagrams to Stochastic Petri Nets: Application to Software Performance Engineering", WOSP'04, Jan. 14-16, 2004.*

* cited by examiner

*Primary Examiner* — Mary C Jacob
(74) *Attorney, Agent, or Firm* — Cantor Colburn LLP (57) ABSTRACT

A method of simulating an information technology (IT) system to produce parametric data includes translating specifications of the IT system from a first modeling language to a second modeling language; incorporating component constraints into the translated specifications; simulating operation of the IT system based on the translated specifications and the component constraints; and generating a report of parametric data based on the simulation.

20 Claims, 6 Drawing Sheets

GENERAL FRAMEWORK TO PREDICT PARAMETRIC COSTS

BACKGROUND

The present invention relates to methods, systems and computer program products for predicting parametric costs of a system under design.

The design process of a computer architecture system typically involves IT architects and specialists designing, building, testing, and re-designing the system. Some design tools allow for virtual modeling and simulation of the application rather than physical implementation. Such design tools do not focus on achieving specific service levels.

Using such design tools presents a risk that non-compliance with service requirements will be discovered very late in the system development cycle. In some instances, the non-compliance is not found until after the system is built and deployed. In such a situation, the cost, in time and money, to modify a non-performing system after it is built is far more expensive than the cost to modify a non-performing system during the design stage. Information such as, for example, response time, resource consumption, availability, and energy consumption can aid the IT architects and specialists in the development of the system.

SUMMARY

According to one embodiment of the present invention, a method of simulating an information technology (IT) system to produce parametric data is provided. The method includes: translating specifications of the IT system from a first modeling language to a second modeling language; incorporating component constraints into the translated specifications; simulating operation of the IT system based on the translated specifications and the component constraints; and generating a report of parametric data based on the simulation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings. It should be understood that throughout the drawings, corresponding reference numerals indicate like or corresponding parts and features.

DETAILED DESCRIPTION

Figure 1:
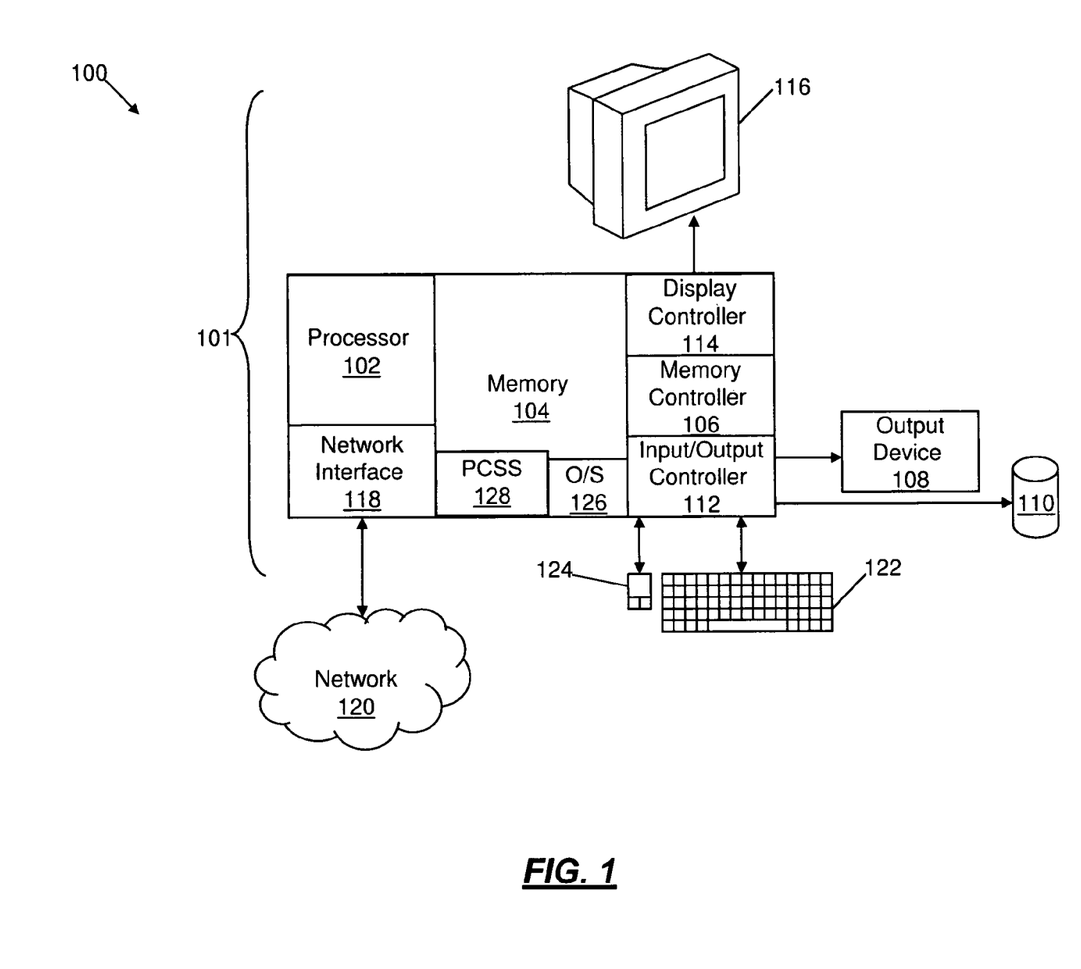
FIG. 1 a functional block diagram illustrating a computing system that includes a parametric cost simulation system in accordance with an exemplary embodiment.

Turning now to the drawings in greater detail, it will be seen that in FIG. 1 an exemplary computing system includes a parametric cost simulation system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122 and mouse 124 can be coupled to the input/output controller 112. In an exemplary embodiment, the computing system 100 can further include a network interface 118 for coupling to a network 120. The network 120 transmits and receives data between the computer 101 and external systems.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of a parametric cost simulation system 128 of the present disclosure. In various embodiments, the parametric cost simulation system 128 of the present disclosure is stored in the memory 104 (as shown), is executed from a portable storage device (e.g., CD-ROM, Diskette, FlashDrive, etc.) (not shown), and/or is run from a remote location, such as from a central server (not shown).

Generally speaking, the parametric cost simulation system 128 operates on high-level functional descriptions of the system under design. The system under design can be an information technology (IT) system that is a combination of hardware, software, and documentation that implements and describes a business solution. The cost simulation system 128 transforms the high-level functional description to a performance model described in a high-level general purpose simulation language, which is then used to simulate the system's physical (hardware) and logical (software) layers. The transformation scheme of the parametric cost simulation system 128 employs well-specified patterns that include variations that reflect different execution policies found in real hardware/software combinations. Using a general representation of the system under design, at a physical level (i.e. with explicit representation of processors, connections, virtualization layers, etc.), the parametric cost simulation system 128 is able to derive estimates for system qualities other than performance.

As an illustrative example, if the performance model supports reasoning about system transactions at a processor cycle level, and for all the devices involved, the energy costs associated with a processing cycle (as opposed to an idle cycle) is known, the global energy consumption can be predicted of a complete system under a given load. When the estimates are unsatisfactory, the parametric cost simulation system 128 can be used to iteratively redesign the system until the estimates become satisfactory.

Moreover, systems or sub-systems verified using the parametric cost simulation system 128 can be reused in the design and verification of other systems. For example, multiple verified sub-systems can be combined as a complete system and re-verified using the parametric cost simulation system 128.

Figure 2:
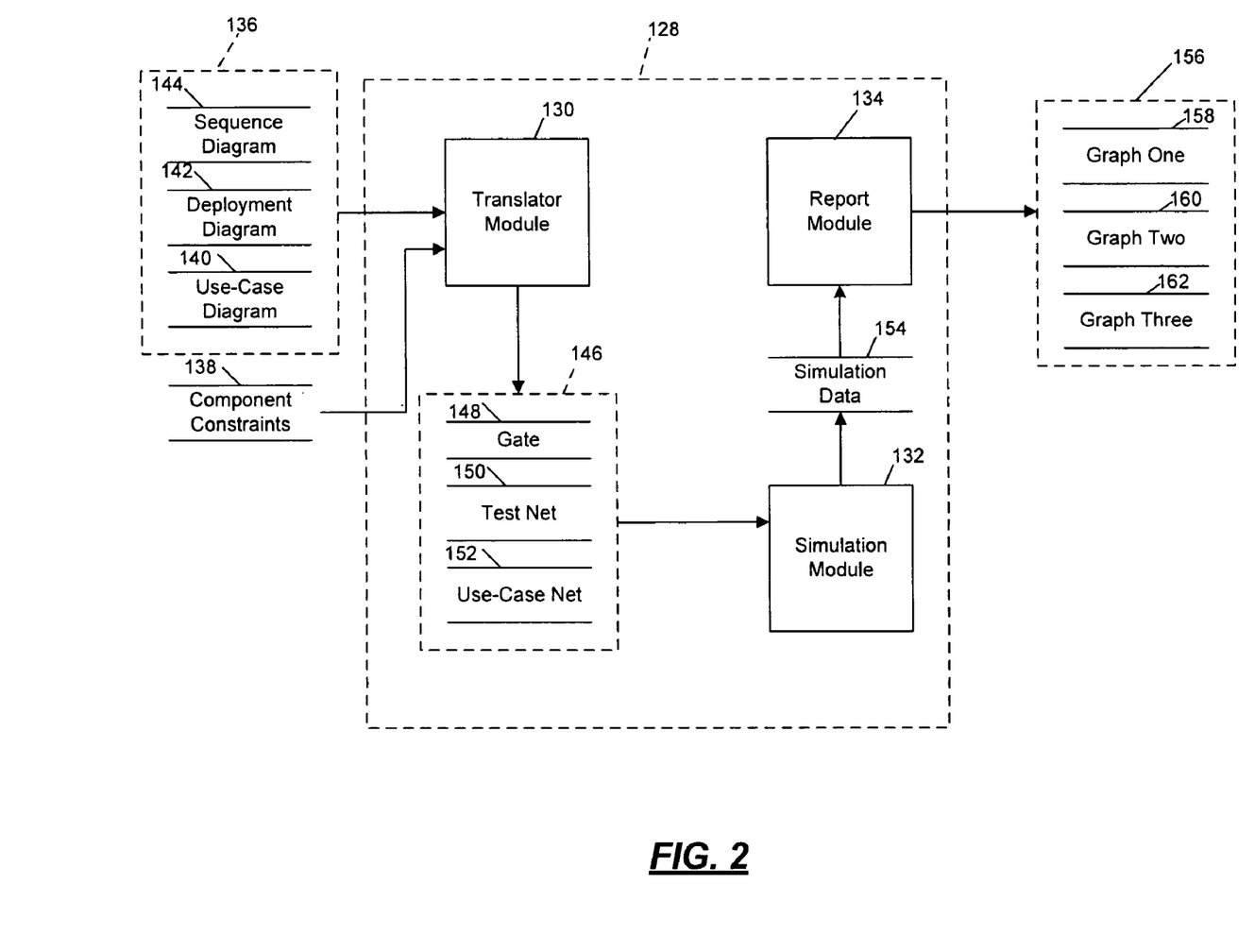
FIG. 2 is dataflow diagram illustrating the parametric cost simulation system of FIG. 1 in accordance with an exemplary embodiment.

Turning now to FIG. 2, the parametric cost simulation system 128 is shown in more detail in accordance with an exemplary embodiment. The parametric cost simulation system 128 includes one or more sub-modules and datastores. As can be appreciated, the sub-modules can be implemented as software, hardware, firmware and/or other suitable components that provide the described functionality. As can be appreciated, the sub-modules shown in FIG. 2 can be combined and/or further partitioned to similarly simulate a system under design to produce parametric costs. In this example, the parametric cost simulation system 128 includes a translator module 130, a simulation model 132, and a report module 134.

The translator module 130 receives as input system specifications 136 and component constraints 138. The system specifications 136 define the system to be simulated and are provided in an object-oriented software modeling language. For exemplary purposes, the disclosure will be discussed in the context of Unified Modeling Language (UML) as the software modeling language. As can be appreciated, the UML example is a non-limiting example and any object-oriented software modeling language may be used for the system specifications.

In the context of UML, the system specifications 136 include one or more structural diagrams and one or more behavioral diagrams. In one example, as shown in FIG. 2, the system specifications include one or more use-case diagrams 140, one or more deployment diagrams 142, and one or more sequence diagrams 144. The use-case diagrams 140 reflect system transactions as well as usage volumetrics representing a test scenario. The deployment diagrams 142 specify the hardware infrastructure and network topology of the system being designed. The sequence diagrams 144 provide the bridge between system transactions and hardware devices, by describing how the former are specified in terms of technical transactions executing in the physical components.

The component constraints 138 include, but are not limited to, processing power, mean-time before failure, and energy cost per CPU cycle, that are associated with components of the system as defined by the diagrams 140-144 mentioned above. In various embodiments, the component constraints 138 are provided in absolute terms (e.g., a number of instructions or processor cycles) rather than relative terms (e.g., a measure of time).

The component constraints 138 can be obtained by actual data, modeled data, and/or predicted data. For example, if the designers have experience with the type of system being constructed they will have already established some rule-of-thumb (i.e. an educated guess) for the initial parametric costs to be considered. If this experience is not available, an alternative example is to look for published information about the performance of specific hardware or software components, an approach referred to as technology research. A third example includes technical prototyping which consists of running measurements against prototype code to estimate parametric costs for specific business functions or technical transactions.

The component constraints 138 can be stored and shared for reuse in similar projects. As can be appreciated, these approaches for constraint determination can be considered at different levels of granularity (such as, for example, at the user level, at a business transaction level, at a technical transaction or SQL primitive level), which influences the complexity of the estimation as well as the accuracy of the obtained performance model. For exemplary purposes, the disclosure will be discussed in the context of the component constraints 138 being provided at the transaction level.

In any of the examples, the component constraints 138 and the system specifications 136 are used by the translator module 130 to generate a performance model 146. The performance model 146 depicts the system in a format that allows estimation of system-wide measures of performance. In various embodiments, the format is according to a performance modeling language that supports simulation. For exemplary purposes, the disclosure will be discussed in the context of Petri Nets or Reference Nets where the Petri Nets are a high-level Timed Petri net variant in which tokens are objects (i.e., Java objects) and transition firing can be associated to the calling methods (i.e., Java methods). As can be appreciated, the Petri nets example is a non-limiting example and any general purpose high level language that supports simulation may be used for generating the performance model. The performance model includes one or more gates 148, one or more test nets 150, and one or more use case nets 152. The generation of such components will be described in more detail with regard to FIGS. 3-5.

The simulation module 132 receives as input the performance model 146. The simulation module 132 simulates operation of the system depicted by the performance model 146 and based on the component constraints 138. The simulation is used to predict running characteristics of the system and to test alternative designs and "what-if" scenarios. During a simulation run, the simulation module 132 extracts the information about how system qualities are impacted by given design decisions. The extracted information is provided as simulation data 154.

The report module 134 receives as input the simulation data 154. The report module generates a graphical representation 156 of the simulation data 154 to aid in the comprehension of the data. In one example, a first graph 158 illustrates end-to-end response times of the system. The first graph 158 can depict the end-to-end response time as a percentage spent at each node and connection. The type of graph allows a designer to identify bottlenecks (i.e. where optimization will be most effective) in the system. A second graph 160 illustrates frequencies of end-to-end response times fore each user-case. This type of graph provides a characterization of response times that may be more readily understandable than the averages presented in the first type of graph. A third graph 162 illustrates a load plot that shows the number of users in the system (and each gate) versus simulation time. This type of graph provides a fine description of the load patterns in a design under given transaction volumetrics. The graphical representation is used to compare and validate the simulation data 154 against a real implementation of the system.

Figure 3:
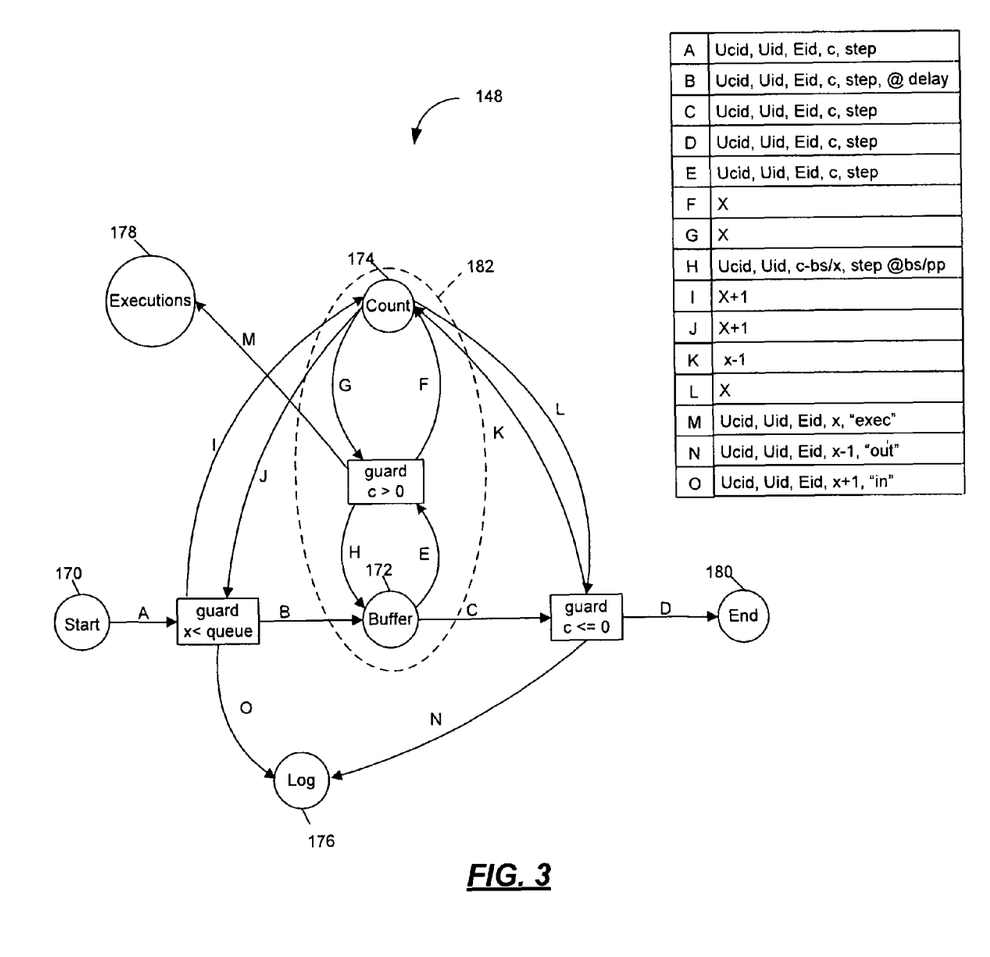
FIG. 3 is a reference net diagram illustrating a gate of a performance model of the parametric cost simulation system of FIG. 2 in accordance with an exemplary embodiment.
Figure 4:
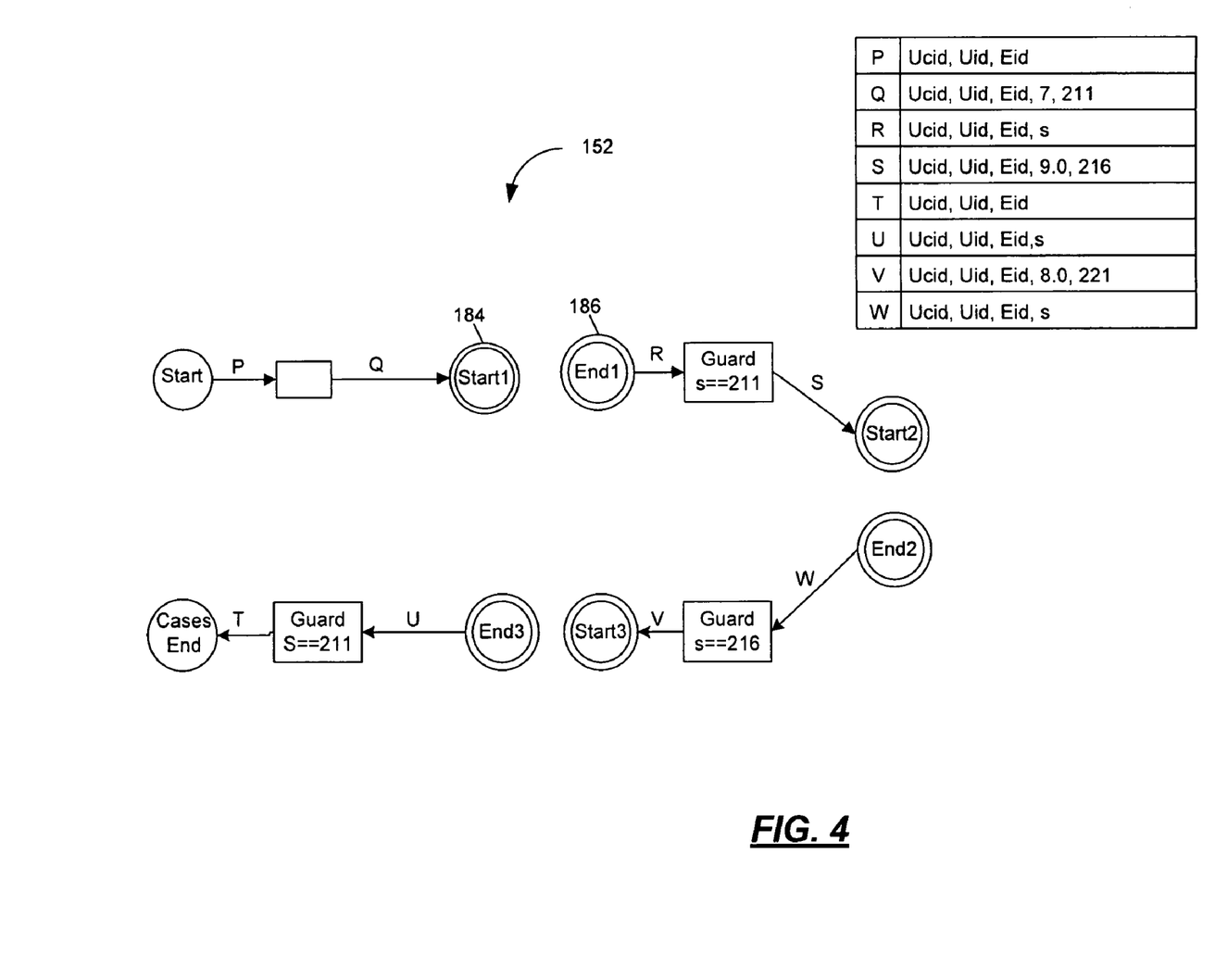
FIG. 4 is a reference net diagram illustrating a use-case net of the performance model of the parametric cost simulation system of FIG. 2 in accordance with an exemplary embodiment.
Figure 5:
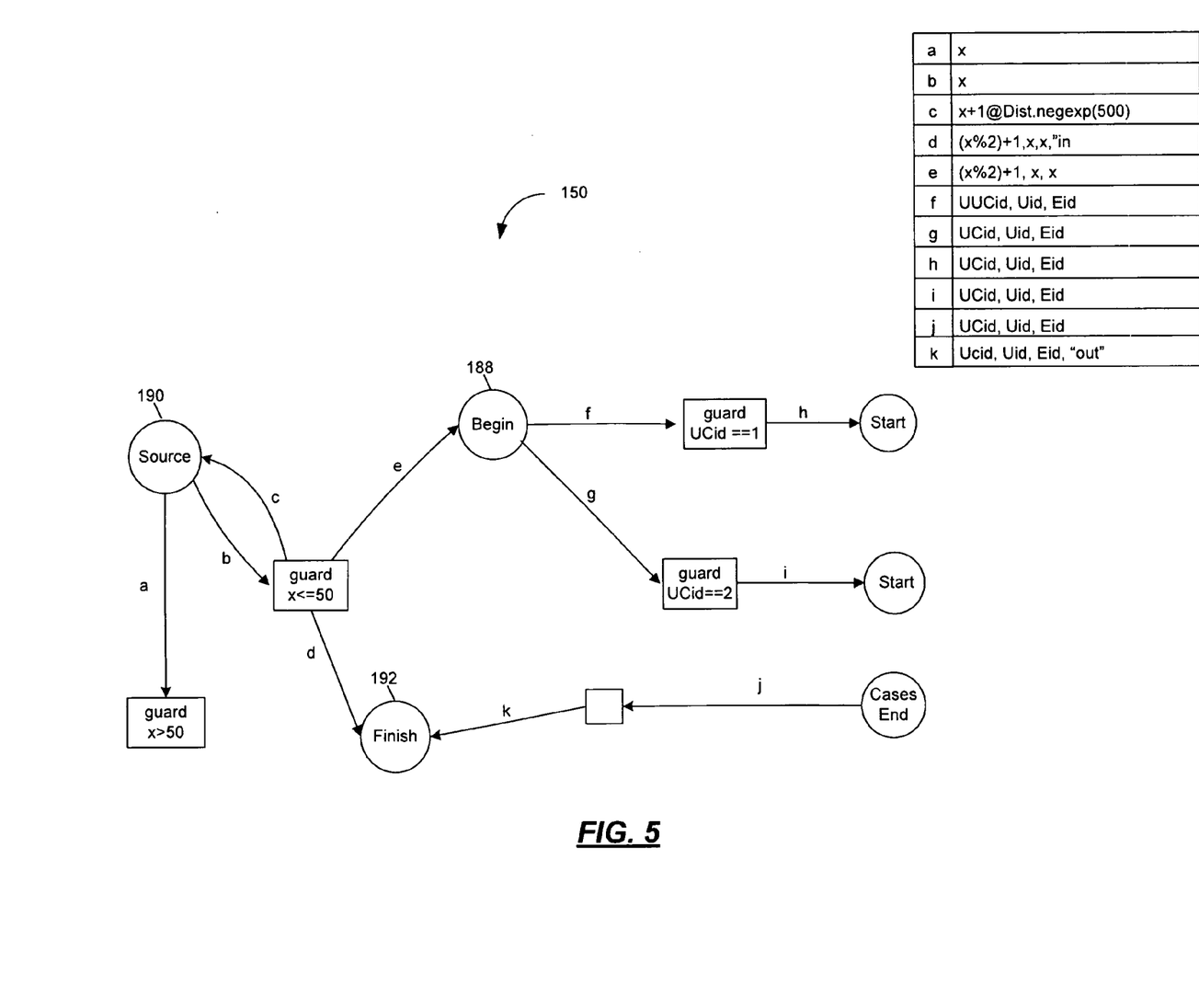
FIG. 5 is a reference net diagram illustrating a test case net of the performance model of the parametric cost simulation system of FIG. 2 in accordance with an exemplary embodiment.

With continued reference to FIG. 2 and reference now to FIGS. 3-5, the generation of the performance model 146 as performed by the translator module 130 is discussed in exemplary embodiments based on the UML and Petri Nets implementation. In this example, the performance model 146 as generated by the translator module 130 includes one or more gates 148, one or more test nets 150, and one or more use-case nets 152.

As shown in FIG. 3, a transition diagram illustrates an exemplary gate 148 of the performance model 146. A gate 148, short for the Parallel Gate (PG) of Petri Nets can be either a node net gate or a connection net gate. These are generated respectively from nodes and connections found in the deployment diagram 142 of the system specifications 136. One such gate 148 is generated to represent each physical node and two such gates 148 are used to generate each connection node. The parameters passed to the node net gate include: processing power (pp), block size (bs), and complexity(c). While the parameters passed to the connection net gates include bandwidth (b), packet size (ps), and message size (s) as shown in Table 1.

| Component | Constraint | Unit |
| --- | --- | --- |
| Node | Processing Power | Mhz |
|  | Block Size | Mcycles |
| Connection | Bandwidth | Kb/sec |
|  | PacketSize | Kb |
| Operation (of a Component) | Complexity | Mcycles |
|  | requestSize | Kb |
|  | responseSize | Kb |

At the transaction level, the component constraints 138 relating to the parameters can be provided in absolute terms (cycles and KB) rather than relative terms (seconds). For example, for nodes and operation complexity, the natural unit is the processor cycle. However, since processor clock speed is currently measured in the megahertz (MHz) and gigahertz (GHz) orders of magnitude, MHz and megacycle (Mcycle) are used as the units. For messages and packet sizes, Kb is used, which means that connection bandwidth is naturally measured in Kb/sec. As can be appreciated, additional quantities not provided in this example, such as main memory and storage space for nodes, can be added by defining additional component constraints 138.

Each gate (node net gate or connection net gate 148) includes, but is not limited to, a start element 170, a buffer element 172, a count element 174, a log element 176, an executions element 178, an end element 180, and a plurality of transitions A-O. During simulation, requests arrive at the start element 170, with a call complexity c, and as the requests are moved to the buffer element 172 (by the initial transition) the value in the count element 174 is incremented by one. This value represents the number of transactions currently in this gate 148. As their remaining complexities are decreased to zero they move from the buffer element 172 to the end element 180 (by the final transition), and from there they continue on their way to form a complete system transaction.

The value in the count element 174 is retained as it defines the degree to which resources need to be divided between competing transactions. The log element 176 stores the time at which transactions enter and leave the gate 148. The executions element 178 stores information about which transaction was treated by a central transition, including the time and level of parallelization that was associated with the transaction.

The process by which the remaining complexity of a technical transaction is decreased inside the gate 148 is controlled by a central transition 182 of the gate 148. This transition 182 executes when the complexity of the transaction in the buffer element 172 is greater than zero (e.g., guard c>o). The execution of the central transition can be governed by the following equations:

$$c_{i+1} = c_i - \frac{bs}{x}, \text{ or} \quad (1)$$

$$\Delta = \frac{bs}{pp} * 1000. \quad (2)$$

Where the equations represent the updating of the remaining complexity (c) and the time elapsed ($\Delta$), at simulation step i+1. At each execution, a token is given 1/x of a cycle block of size BlockSize (bs), where x is the number of concurrent users, as stored in the count element. The transition takes time $\Delta$ corresponding to the sending of the whole block (so that the same transition may not be served twice in the same block). This value depends on bs (Mcycles) and on the processing power (pp) at the node (MHz=Mcycles/sec). The value in seconds is then converted to milliseconds. Variables bs and pp are instantiated with values when the gate is created (e.g., bs is set to 10 and pp is set to 1000). This construct, by splitting each packet up between transactions, approximates uniform resource-sharing over time.

The connection net gates 148 are modeled with the same gates, disregarding propagation delay and considering processing delay (in which Bandwidth replaces Processing-Power). This corresponds to replacing ps for bs (packet size for block size) and b for pp (bandwidth for processing power) in equations 1 and 2.

In various embodiments, the following equations can be used in place of equations 1 or 2:

$$c_{i+1} = c_i - bs, \text{ or} \quad (3)$$

$$\Delta = \frac{bs}{pp} * x * 1000. \quad (4)$$

In this scheme packets (blocks) are not divided between concurrent transactions. Instead, each transaction is given a full package and delayed by the time it takes to process the transaction multiplied by the number of concurrent transactions. This alternative corresponds to a time-sharing scheme.

In various embodiments, propagation delay can be added to the gate by delaying tokens moved from the first transition to the buffer element 172 by the value of the propagation delay.

In various embodiments, queuing effects can be modeled by limiting the number of transactions allowed in a gate 148 to a parallelization threshold. By keeping a count of the number of elements in a queue, requests arriving when the queue reached some queue size can be dropped. This scheme does not guarantee FIFO order but it does ensure that resources are not shared too thinly among concurrent transactions. The modifications to the standard gate to implement the queue, as well as propagation delay are provided in the queue parameter and the delay parameter.

Turning now to FIG. 4, a use-case net 152 is shown in accordance with an exemplary embodiment. The use-case net 152 depicts information about the sequence of gate executions (technical transactions) and is formed from the sequence diagrams 144 and the use-case diagrams 140. The use-case net 152 includes transitions P-W that carry tokens from an element of a gate to a start element of a following gate. One such use-case net 152 is generated for each sequence diagram 144 that is mentioned in an associated use-case diagram 140. In various embodiments, the virtual place construct of Renew (an element with double borders) is used to create copies of start elements 184 and end elements 186 of each gate 148. This is done to keep the use-case nets 152 uncluttered and understandable. Each pair of the virtual start elements 184 and the virtual end elements 186 appears as a gap in the sequence, each of these gaps represents a gate 148 that the transaction has to go through (i.e. each gap is connected by the respective gate, represented separately).

Turning now to FIG. 5, a test net 150 is shown in accordance with an exemplary embodiment. The test net 150 includes a begin element 188, a source element 190, and a finish element 192, transitions a-k, and a combination of the various use-case nets 152. The test net 150 is used to generate the user requests. In various embodiments, the test net 150 is constructed with inter-user delay defined deterministically or picked randomly from a probabilistic distribution. The test net 150 encodes user volumetrics, user behavior, length of the simulation and stores end-to-end entry and conclusion events for each individual system transaction.

In various embodiments, one actor is selected from the use-case diagram 140. The total number of user requests generated in this way (which limits the length of the simulation) is defined in the Max constraint of this actor (as an integer). The distribution of inter-user delays (in ms) is defined in the Distribution constraint and can be defined as an integer or as a call to classes that implement statistical distribution functionality available in the de.renew.util.Dist package. In this way distributions such as the negative exponential can be represented directly in UML, along with their parameters. Generated user requests are sent to each use-case net 152 sequentially.

The times at which individual transactions enter and exit the system are recorded in the finish element. It is because of the constructs needed to extract this data from Renew (presented in the following section) that simulation length is bound via the Max constraint (that is, we need to know when the simulation is finished). For this reason we cannot, at the time, run arbitrarily long simulations with termination controlled by the user. In various embodiments, this functionality can be implemented simply using the renew construct named manual transition. In addition to manual transitions other extensions are considered, such user classes and behaviors and a testing framework for sensitivity analysis.

Figure 6:
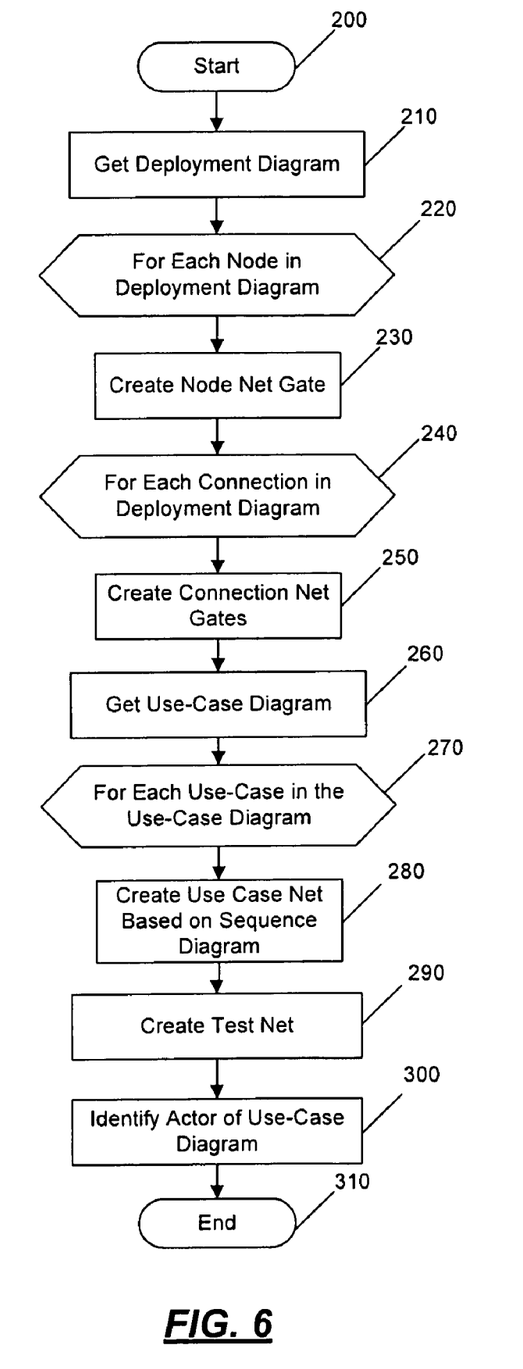
FIG. 6 is a flowchart illustrating a translation method that can be performed by the parametric cost simulation system of FIG. 2 in accordance with an exemplary embodiment.

Turning now to FIG. 6, a translation method that can be performed by the translator module 130 of FIG. 2 is shown in accordance with an exemplary embodiment. As can be appreciated in light of the disclosure, the order of operation within the method is not limited to the sequential execution as illustrated in FIG. 6, but may be performed in one or more varying orders as applicable and in accordance with the present disclosure.

The method may begin at 200. The deployment diagram is retrieved at 210. For each node in the deployment diagram at 220, a Node Net gate is created at 230. For each connection in the deployment diagram at 240, a Connection Net gate is created at 250. The use case diagram is retrieved at 260. For each use-case found in the use-case diagram at 270, a use-case net is created by matching the use case (by name, for example) with a sequence diagram that specifies the corresponding technical transactions. Thereafter, an actor of the use case diagram is determined at 280, and a corresponding test net is created based on the actor at 290. Finally, the internal representation of the Net Patterns is converted to performance modeling language (i.e., PNML) at 300. Thereafter, the method may end at 310.

As will be appreciated by one skilled in the art, the present invention may be embodied as a system, method or computer program product. Accordingly, the present invention may take the form of an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-useable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instruction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of simulating an information technology (IT) system to produce parametric data, the method comprising:
translating specifications of the IT system from a first modeling language to a second modeling language, the translating of the specifications creating at least one gate that includes a start element, a buffer element, a count element, and a value;
incorporating component constraints into the translated specifications;
simulating operation of the IT system based on the translated specifications and the component constraints, wherein a request arrives at the start element, and as the requests are moved to the buffer element the value in the count element is incremented by one; and
generating a report of parametric data based on the simulation.

2. The method of claim 1 further comprising providing at least one deployment diagram, at least one sequence diagram, and at least one use-case diagram as the specifications.

3. The method of claim 1 wherein the translating further comprises translating the specifications into at least one test net, and at least one use-case net.

4. The method of claim 3 wherein the translating further comprises translating the specifications into a single gate for each component of the IT system and at least two gates for each connection of the IT system.

5. The method of claim 1 further comprising providing parametric data for each component of the IT system as the component constraints.

6. The method of claim 5 wherein the providing parametric data comprises providing at least one of a processing power, a mean-time before failure, and an energy cost per processor cycle.

7. The method of claim 1 wherein the generating the report further includes generating a graphical representation of the parametric data.

8. The method of claim 7 wherein the generating the report further includes generating at least one of end-to-end response times of the IT system, end-to-end response times of user cases of the IT system, and a load plot that includes a number of users in the IT system versus a simulation time.

9. A simulation system to produce parametric data, the system comprising:
a computer;
a translator module that is part of the computer and translates specifications of an information technology (IT) system from a first modeling language to a second modeling language, and that incorporates component constraints into the translated specifications, the translated specifications including at least one gate that includes a start element, a buffer element, a count element, and a value;
a simulation module that is part of the computer and simulates operation of the system based on the translated specifications and the component constraints, wherein a request arrives at the start element, and as the requests are moved to the buffer element the value in the count element is incremented by one; and a report module that is part of the computer and generates a report of parametric data based on the simulation.

10. The system of claim 9 wherein the first modeling language includes an object-oriented modeling language.

11. The system of claim 10 wherein the first modeling language includes a Unified Modeling Language (UML).

12. The system of claim 9 wherein the specifications include at least one deployment diagram, at least one sequence diagram, and at least one use-case diagram.

13. The system of claim 9 wherein the second model language includes a simulation modeling language.

14. The system of claim 13 wherein the second model language includes Petri Nets.

15. The system of claim 9 wherein the translated specifications include at least one test net, and at least one use-case net.

16. The system of claim 15 wherein the translated specifications further include a single gate for each component of the IT system, and at least two gates for each connection of the IT system.

17. The system of claim 9 wherein the component constraints include parametric data of components of the IT system.

18. The system of claim 17 wherein the component constraints further include at least one of a processing power, a mean-time before failure, and an energy cost per processor cycle.

19. The system of claim 9 wherein the report includes a graphical representation of the parametric data.

20. The system of claim 19 wherein the report includes at least one of end-to-end response times of the IT system, end-to-end response times of user cases of the IT system, and a load plot that includes a number of users in the IT system versus a simulation time.

* * * * *